United States Patent [19]

Maubray

[11] Patent Number: 5,713,099
[45] Date of Patent: Feb. 3, 1998

[54] WINDSCREEN WIPER PROVIDED WITH A FLEXIBLE DEFLECTOR HAVING MEANS OF FIXING TO THE WIPER BLADE

[75] Inventor: Daniel Maubray, Issy Les Moulineaux, France

[73] Assignee: Valeo Systemes D'Essuyage, La Verriere, France

[21] Appl. No.: 726,051

[22] Filed: Sep. 27, 1996

[30] Foreign Application Priority Data

Sep. 29, 1995 [FR] France .................. 95 11505

[51] Int. Cl.[6] .................. B60S 1/04; B60S 1/38
[52] U.S. Cl. .................. 15/250.201
[58] Field of Search .................. 15/250.201, 250.44, 15/250.451, 250.452, 250.453, 250.46, 250.351

[56] References Cited

U.S. PATENT DOCUMENTS

| | | | |
|---|---|---|---|
| 4,570,284 | 2/1986 | Verton | 15/250.201 |
| 4,590,638 | 5/1986 | Beneteau | 15/250.201 |
| 5,206,969 | 5/1993 | Patterson et al. | 15/250.201 |
| 5,283,925 | 2/1994 | Maubray | 15/250.201 |
| 5,392,489 | 2/1995 | Mohnach | 15/250.201 |

FOREIGN PATENT DOCUMENTS

| | | |
|---|---|---|
| 429 334 | 5/1991 | European Pat. Off. . |
| 2 145 928 | 8/1984 | United Kingdom . |

Primary Examiner—Gary K. Graham
Attorney, Agent, or Firm—Morgan & Finnegan, L.L.P.

[57] ABSTRACT

The invention concerns a windscreen wiper for a motor vehicle, of the type having a windscreen wiper arm provided with an articulated structure which carries, by means of a series of claws, a wiper blade made of a flexible material, and of the type having a flexible aerodynamic deflector mounted on the arm, wherein the deflector has at least one clasp for fixing it onto the blade of the arm.

7 Claims, 2 Drawing Sheets

5,713,099

WINDSCREEN WIPER PROVIDED WITH A FLEXIBLE DEFLECTOR HAVING MEANS OF FIXING TO THE WIPER BLADE

FIELD OF THE INVENTION

The present invention concerns a windscreen wiper provided with a flexible deflector having means for attaching it to the wiper blade, the like. More particularly, the invention involves a windscreen wiper for a motor vehicle, of the type having a windscreen wiper arm provided with an articulated structure deformable in a longitudinal plane perpendicular to a window to be wiped the wiper arm carries, by means of a series of claws arranged at each of its terminal ends, a wiper blade made of a flexible material, the wiper arm presses the blade against the window so that the blade adopts the curvature thereof, and has a flexible aerodynamic deflector mounted on the arm.

BACKGROUND OF THE INVENTION

An aerodynamic deflector for a windscreen wiper arm makes it possible, firstly, to provide aerodynamic support tending to press the arm against the window when the vehicle is moving at high speed and, secondly, to prevent streams of air flowing along the window from interfering with the contact of the blade with the window, which is detrimental to effective wiping thereof.

For this purpose, it is necessary for the deflector to be situated as close as possible to the blade and therefore as close as possible to the window to be wiped. However, the wiper blade is liable to adopt the curvature of the window, which can be very pronounced, notably in the case of the front windscreen of a motor vehicle, and it has therefore appeared advantageous to produce the aerodynamic deflector from a flexible material in order for it to be able to follow the deformations of the blade and therefore the curvature of the windscreen.

Thus, a flexible deflector has been proposed, mounted on the articulated structure of the windscreen wiper arm and having control fingers bearing on an upper back of the blade and able to transmit the deformations of the blade to the deflector.

However, this device proves to be highly complex. It also requires attachment points for the deflector on the articulated structure which allow vertical sliding of the deflector with respect to the articulated structure. The fingers controlling the deformations of the deflector, which bear unidirectionally on the arm, are not able to give rise to the return of the deflector to its idle position.

The elasticity of the material from which the deflector is produced therefore needs to be relied upon in order for it to resume its initial shape. This entails exerting itself at any time a parasitic force on the blade tending to increase its pressure of contact with the window at the centre of the arm, to the detriment of the ends.

DISCUSSION OF THE INVENTION

According to the present invention, there is provided a windscreen wiper for a motor vehicle, of the type having a windscreen wiper arm provided with an articulated structure deformable in a longitudinal plane perpendicular to a window to be wiped the wiper arm carries, by means of a series of claws arranged at each of its terminal ends, a wiper blade made of a flexible material, and which presses the blade against the window so that the blade adopts the curvature thereof. A flexible aerodynamic deflector mounted on the arm, has at least one clasp for fixing the deflector onto the blade of the arm.

According to other characteristics of the invention:

- the fixing clasp has an upper back bearing against an upper face of an edge of the blade and two parallel lateral legs which extend downwards from the upper back, opposite lateral faces of the edge, and which are provided with lower ends curved inwards in the direction of the blade so as to be received in the housings of the edge;
- the housings of the edge of the blade are longitudinal grooves designed for the attachment of the claws of the articulated structure;
- the fixing clasp is connected to the deflector by a connecting tie which extends from a lateral face of the deflector turned in the direction of the arm;
- the fixing clasp is produced of a single piece with the deflector;
- the fixing clasp is produced from rigid plastic and the deflector is moulded onto the clasp;
- the deflector has several fixing clasps distributed longitudinally, notably regularly.

BRIEF DESCRIPTION OF THE DRAWINGS

Other characteristics and advantages of the invention will emerge from a reading of the detailed description which follows, for an understanding of which reference will be made to the accompanying drawings in which.

DESCRIPTION OF THE PREFERRED EMBODIMENT

Figure 1:
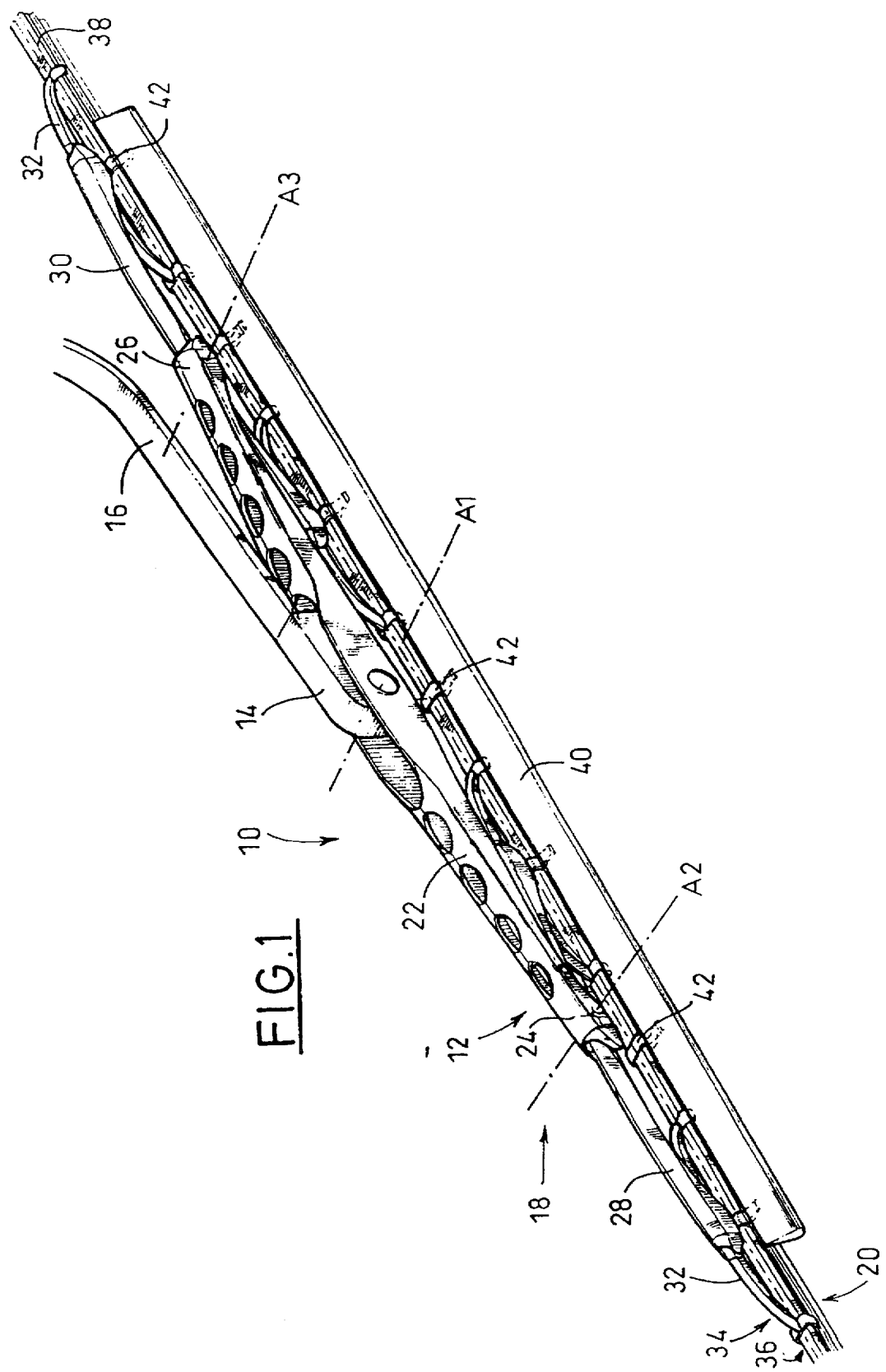
FIG. 1 is a perspective view of a windscreen wiper in accordance with the teachings of the invention.

In FIG. 1 a windscreen wiper 10 for a motor vehicle has been shown which has a wiper arm 12 which is mounted to pivot about a transverse axis A1, at the front longitudinal end 14 of a bar 16 which drives the windscreen wiper 10 in alternate sweeping.

In a known manner, the wiper blade 12 has an articulated structure 18 which extends in a longitudinal plane substantially perpendicular to the overall plane of a window to be wiped (not shown) and which carries a wiper blade 20 which it is designed to press against the window.

For this purpose, the articulated structure 18 has a main stirrup 22 which is pivotally mounted on the front end 14 of the arm 16 and at each of the longitudinal ends 24, 26 of which there pivot, about respective transverse axes A2, A3, secondary stirrups 28, 30 which in turn carry, at each of their longitudinal ends, pivoted brackets 32.

The pivoted brackets 32 have, at each of their two longitudinal ends 34, fixing clasps, lugs on claws 36 for attaching the blade 20 and which cooperate with an upper edge 38 of the blade 20.

The wiper arm 12 thus depicted is a long arm which consequently has a main stirrup 22, two secondary stirrups 28, 30 and four brackets 32, and thus has eight fixing clasps 36 for the blade 20. It is self-evident that, for a short wiper arm 12, it is possible to reduce the number of fixing clasps 36 by omitting, for example, a bracket 32 or even one of the secondary stirrups 28, 30.

The wiper arm 12 according to the invention is provided with a flexible aerodynamic deflector 40 which extends longitudinally over one side of the blade 20.

In accordance with the teachings of the invention, the flexible deflector 40 has fixing clasps 42, each of which is attached to the edge 38 of the wiper blade 20.

Figure 2:
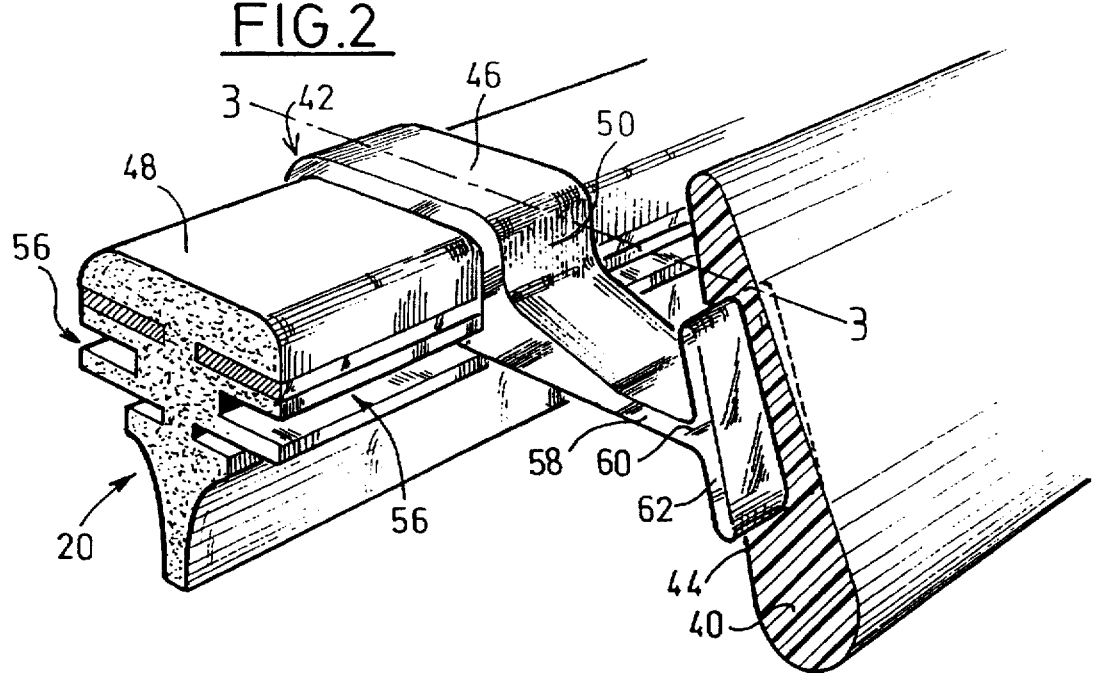
FIG. 2 is an enlarged detail of FIG. 1 showing more particularly a clasp for fixing the deflector on the blade.
Figure 3:
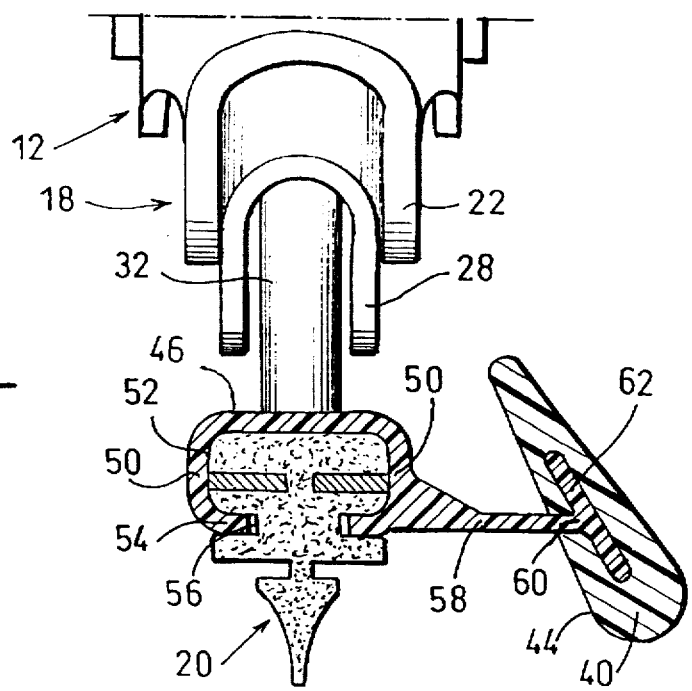
FIG. 3 is a view in transverse section along the plane 3—3 in FIG. 2.

As can be seen more particularly in FIGS. 2 and 3, the fixing clasps 42 have a connecting tie 58 which extends transversely from a lateral face 44 of the deflector 40 turned in the direction of the arm 12.

The fixing clasps 42 have in transverse section a shape substantially identical to that of the fixing clasps 42 (FIG. 1) of the articulated structure 18 which carry the blade 20.

The clasps (FIGS. 2 and 3) have an upper transverse back 46 which bears against an upper face 48 of the edge 38 of the blade 20.

Two lateral legs 50, which extend downwards from the upper back 46, along lateral faces 52 of the edge 38, each have a lower extremity 54 which is curved in the direction of the arm 20 and which is received in a longitudinal groove 56 provided for this purpose in each of the lateral faces 52 of the edge 38.

Preferably, the longitudinal grooves 56 are the grooves, already in existence, designed to receive curved extremities (not shown) of the claws 36 for attaching the blade 20.

Each fixing clasp 42 is thus able to slide on the edge 38 of the arm and complementary means (not shown) are provided for locking the deflector 40 longitudinally with respect to the blade 20.

In the example embodiment depicted in the figures, the fixing clasps 42 are produced in the form of independent parts made of rigid plastic whose connecting ties 58 have, at their free end 60, an insert plate 62 around which the deflector 40 is moulded.

This embodiment enables the flexible deflector to be made from a material of very low density.

It is also possible to envisage producing the fixing clasps 42 in a single piece with the flexible deflector, for example by molding.

It is possible to produce a deflector 40 which has only one fixing clasp 42 for fixing on the blade 20 according to the invention but which has other means for fixing, for example on the articulated structure 18 of the arm 12. In this case, the fixing clasp serves to control the deformation of the deflector 40 according to the deformations of the blade 20.

What is claimed:

1. A windscreen wiper for a motor vehicle curved windscreen, having a windscreen wiper arm provided with an articulated structure with terminal ends, the articulated structure being deformable in a longitudinal plane perpendicular to the windscreen to be wiped and which carries, by means of a series of claws at each of the articulated structure terminal ends, a wiper blade made of a flexible material, and which presses the blade against the windscreen so that the blade adopts the curvature thereof, and having a flexible aerodynamic deflector mounted on the windscreen wiper arm, the improvement comprising the deflector having a longitudinal dimension and a plurality of fixing clasps for fixing the deflector onto the arm only through attachment to the blade, the fixing clasps receiving the blade therein and being longitudinally spaced from the claws to enable the deflector to adopt the blade curvature.

2. A windscreen wiper as claimed in claim 1, wherein the fixing clasp has an upper back bearing against an upper face of an edge of the blade and two parallel lateral legs which extend downwards from the upper back, opposite lateral faces of the edge, and which are provided with lower ends curved inwards in the direction of the blade so as to be received in housings in the edge.

3. A windscreen wiper as claimed in claim 2, wherein the housings in the edge of the blade are longitudinal grooves designed for receiving the claws of the articulated structure.

4. A windscreen wiper as claimed in claim 2, wherein the deflector has a lateral face, each of the fixing clasps are connected to the deflector by an individual connecting tie, each of the ties extending from the lateral face of the deflector turned in the direction of the arm.

5. A windscreen wiper as claimed in claim 1, wherein individual fixing clasps each are a single piece with the deflector.

6. A windscreen wiper as claimed in claim 1, in which the fixing clasp further comprises a rigid plastic and a connecting tie, wherein the deflector is molded around the connecting tie.

7. A windscreen wiper as claimed in claim 1, wherein the plurality of fixing clasps are distributed longitudinally on the blade of the wiper arm at regular intervals therebetween.

* * * * *